United States Patent [19]

Kitajima et al.

[11] Patent Number: 5,069,543
[45] Date of Patent: Dec. 3, 1991

[54] APPARATUS FOR MEASURING DISTANCES AT MANY POINTS

[75] Inventors: Tomoya Kitajima, Kawasaki; Akira Suzuki, Yokohama, both of Japan

[73] Assignee: Ricoh Company, Ltd., Tokyo, Japan

[21] Appl. No.: 482,962

[22] Filed: Feb. 22, 1990

[30] Foreign Application Priority Data

Feb. 23, 1989 [JP] Japan .................................. 1-41737

[51] Int. Cl.⁵ .............................................. G01C 3/08
[52] U.S. Cl. .................................... 356/4; 356/141
[58] Field of Search ................ 356/4, 5, 1, 141, 152

[56] References Cited

U.S. PATENT DOCUMENTS

| | | | |
|---|---|---|---|
| 4,514,084 | 4/1985 | Makino et al. | 356/4 |
| 4,768,053 | 8/1988 | Matsuda et al. | 356/4 X |
| 4,874,239 | 10/1989 | Tamura | 356/4 |
| 4,922,281 | 5/1990 | Kitajima | 354/404 |
| 4,947,202 | 8/1990 | Kitajima et al. | 354/403 |

*Primary Examiner*—Mark Hellner
*Attorney, Agent, or Firm*—Oblon, Spivak, McClelland, Maier & Neustadt

[57] ABSTRACT

An apparatus for measuring distances at many points has a section for performing a distance measuring operation. The apparatus comprises a projector for selectively irradiating a projected light beam to a photographed object in a plurality of directions; a light-receiving element for receiving light reflected from the photographed object; a selecting circuit for detecting the direction of at least one projected light beam corresponding to a great change in output caused in the light-receiving element when the light beam projected from the projector is selectively irradiated to the photographed object in the plural directions; and a measured distance detecting section for performing the distance measuring operation in the direction of the projected light beam detected by the selecting circuit and providing measured distance information with respect to at least one point. The apparatus may further comprise a moving member for moving an optical axis for distance measurement of the measured distance detecting section integrally or in association with the received light beam of the light-receiving element, the projected light beam of the projector, or both of these light beams. The apparatus may further comprise other constructional sections for performing the distance measuring operation.

11 Claims, 9 Drawing Sheets

LIGHT-RECEIVING ANGLE R

APPARATUS FOR MEASURING DISTANCES AT MANY POINTS

BACKGROUND OF THE INVENTION

1. Field of the Invention

The present invention relates to an apparatus for measuring distances at a plurality of points of a photographed object.

2. Description of the Related Art

Recently, a camera has been mainly provided with an automatic focusing device which can measure the distance of a photographed object and automatically perform a focusing operation by moving a focusing drive member of a photographing lens and controlling the operation thereof based on the results of the measured distance.

There are so-called passive and active systems as a distance measuring apparatus used in such an automatic focusing device.

In the distance measuring apparatus of the passive system, an element for detecting the measured distance such as CCD, etc. is arranged in each of positions in which images are formed by two image forming optical systems spaced from each other by a predetermined base length. This apparatus is constructed to detect a shift in spatial phase of two images formed in this measured distance detecting element.

On the other hand, in the distance measuring apparatus of the active system, for example, an ultrasonic wave or a near infrared ray is irradiated toward the photographed object and a wave or ray reflected from the photographed object is detected to measure the distance of the photographed object.

In the distance measuring apparatus of the passive or active system. The distance of the photographed object located in the center of a photographed picture is generally measured and a focusing position of the photographing lens is adjusted on the basis of the measured results. Therefore, the phenomenon of a so-called out of focus of main photographed object or miss target can be caused.

This content will next be explained in detail in the following description. For example, in the case of a composition in which two main photographed objects such as men exist on the left-hand and right-hand sides with respect to a central portion of a picture, a region for detecting the measured distance is set in the central portion of the picture. Accordingly, when the distance is measured in such a state, the distance of an infinite background located at a far distance in the central portion of the picture is measured and the focusing operation is performed on the basis of this result. Therefore, the background in the central portion of the picture is focused and the main objects to be focused and photographed are defocused.

To avoid such a situation, the camera is inclined such that the measured distance detecting region is in conformity with a portion of the object to be focused and photographed. In such a state, the camera is locked in a focusing state and the operating state of the camera is returned to the original state, i.e., the composition state in which the two main photographed objects such as men exist on the right-hand and left-hand sides with respect to the central portion of the picture, thereby performing photographing and exposing operations. Thus, the above problems are prevented. However, in such a photographing method, the operation of the camera is complicated and the picture is not taken at a high speed so that this method is not practical so much.

Therefore, the necessity for solving the disadvantages in the distance measurement using only the central portion of the picture has been recognized. For example, in a distance measuring apparatus proposed in Japanese Patent Application Laying Open (KOKAI) No. 59-193307, the measured distance detecting region is disposed in the central portion of the picture and an additional measured distance detecting region is added to synthetically provide the focusing position of the photographing lens by performing the distance measuring operation in each of these plural regions.

A distance measuring apparatus of the active system for embodying an idea of the distance measurement with respect to a plurality of points is proposed in Japanese Patent Application Laying Open (KOKAI) No. 62-223734. In this apparatus, three light-emitting diodes are arranged in array to form a light-emitting portion. The distances at three points are measured by optical axes for detecting the measured distance and having three inclinations different from each other with respect to an optical axis of the photographing lens using a large-sized PSD as a distance measuring section. One of the above optical axes is approximately parallel to the optical axis of the photographing lens. Thus, the above distance measuring apparatus provides a construction for causing no out of focus of main photographed object or the miss target etc.

In the camera having such an apparatus for measuring the distances at many points, the distances at many points are measured and a focal point of the photographing lens can be determined from the results of the measured distances so that it is possible to avoid the disadvantages such as the out of focus of main photographed object or the miss target etc.

However, such an apparatus for measuring the distances at many points has the following first to fifth problems.

Namely, in the first problem, with respect to the focal distance of the photographing lens in the camera, there have been recently many compact and cheap zoom lenses having a high performance so that the detected distance of the photographed object is increased by the increase in focal distance of the photographing lens, thereby reaching the limit of the distance measuring apparatus of the active system.

Namely, when the focal distance of the photographing lens is 105 mm and F is about 5.6, it is necessary to perform the measuring operation with respect to the distance of the Photographed object about 30 to 40 m. However, in the distance measuring apparatus of the active system, light cannot be emitted until such a long distance since the distance of the photographed object for irradiation is limited to about 10 m by the relation between the actual size of a light-emitting source and the size of a power source thereof. Therefore, it is difficult to measure the above distance about 30 to 40 m.

Therefore, the distance measuring apparatus of the passive system must be adopted. In this case, it is considered to dispose distance measuring devices corresponding to the number of measured distances at many points for only respective regions for performing the distance measuring operation. However, in such a case, the entire apparatus becomes complicated and the cost thereof greatly increases so that it is difficult to arrange the distance measuring devices compactly within the camera. Therefore, it is considered to dispose only one set of the distance measuring devices in the camera and sequentially move the distance measuring devices in accordance with a plurality of optical axes for distance measurement corresponding to the measured distances at many points to measure all the distances (in all the regions for measuring the distances at many points) with respect to the respective optical axes for distance measurement. However, in reality, the measuring operation is also performed with respect to a far distance such as infinity to be neglected so that there are a lot of redundancy and it takes much time to substantially measure the distances at many points.

In the second problem, when it is sufficient to irradiate light by the distance of the photographed object about 10 m by the distance measuring apparatus, it is considered to dispose distance measuring devices corresponding to the number of measured distances at the many points for only the respective distance measuring regions. However, in this case, the apparatus becomes complicated and the cost thereof greatly increases so that it is difficult to arrange the distance measuring devices compactly within the camera. Therefore, it is considered to dispose only one set of the distance measuring devices in the camera and sequentially move the distance measuring devices in accordance with a plurality of optical axes for distance measurement corresponding to the measured distances at many points to measure all the distances (in all the regions for measuring the distances at many points) with respect to the respective optical axes for distance measurement. However, in reality, the measuring operation is also performed with respect to a far distance such as infinity to be neglected so that it takes much time to substantially measure the distances at many points. Further, in the distance measuring apparatus of the active system, when a light beam from a light source is irradiated in a wide range including all the optical axes for distance measurement at many points, it is possible to fix a light-emitting portion in the distance measuring apparatus. However, in such a case, the real size of the light-emitting source and the size of a power source thereof are increased so that this case is not practical. Therefore, it is necessary to reduce the capacity of the light source as much as possible such that the light of the light source is irradiated to only a region in which distance is really measured. To satisfy this requirement, it is necessary to move the light source integrally with a portion for measuring the distances at many points with high accuracy such that the light of the light source is irradiated to only the region in which distance is really measured.

In the third problem, when the photographing lens disposed in the camera having the distance measuring apparatus has a variable focal point, the entire distance measuring apparatus is moved to move the distance measuring region such that a distance measuring point in a photographed picture is not moved in accordance with the change in photographing angle of view corresponding to the change in focal distance, thereby measuring the distances at many points. Therefore, it is necessary to use members such as a motor having a large driving force for driving the entire distance measuring apparatus so that the entire distance measuring apparatus is large-sized.

In the fourth problem, when the apparatus for measuring the distances at many points is constructed by driving one distance measuring device corresponding to a plurality of optical axes for distance measurement at many points, the driving direction thereof is rotated around a central axis of rotation perpendicular to a triangular plane including the plurality of optical axes for distance measurement at many points. Therefore, this moving direction is an arranging direction of the measured distance detecting elements so that a noise is caused in a stopping state of the rotation and is provided as information of the measured distances and accuracy in detection of the measured distances is reduced. Accordingly, it is necessary to restrain in a slight movement in rotary stoppage and improve accuracy therein. Therefore, a controller for controlling the operation of the distance measuring apparatus becomes complicated and therefore the construction of the entire apparatus becomes complicated.

In the fifth problem, when the photographing lens disposed in the camera having the distance measuring apparatus has a variable focal point, the entire distance measuring apparatus is moved to move the distance measuring region such that a distance measuring point in a photographed picture is not moved in accordance with the change in photographing angle of view corresponding to the change in focal distance, thereby measuring the distances at many points. Therefore, it is necessary to dispose a mechanism for moving the entire distance measuring apparatus so that the construction of the apparatus becomes complicated. Further, since the entire distance measuring apparatus is driven, it is necessary to dispose a large-sized driving source for driving the apparatus so that the construction of the apparatus is complicated and large-sized.

SUMMARY OF THE INVENTION

It is therefore a first object of the present invention to provide a distance measuring apparatus simplified in construction as much as possible and reducing a time for substantially measuring distances at many points in consideration of the above-mentioned first problem.

A second object of the present invention is to provide a many point distance measuring apparatus of an active system in which the capacity of a light source is reduced as much as possible so as to irradiate light of the light source to only a region in which distance is really measured and the light source can be moved integrally with a portion for measuring distances at many points with high accuracy in consideration of the above-mentioned second problem.

A third object of the present invention is so provide a many point distance measuring apparatus in which the entire apparatus can be made compact without using members such as a motor having a large driving force for driving the entire distance measuring apparatus in consideration of the above-mentioned third problem.

A fourth object of the present invention is to provide a many point distance measuring apparatus in which a moving direction of the distance measuring apparatus in the measurement of distances at many points is not an arranging direction of measured distance detecting elements and no noise is provided as information of the measured distances in a stopping state of rotation in consideration of the above-mentioned fourth problem.

A fifth object of the present invention is to provide a many point distance measuring apparatus in which no large-sized driving source is required and the apparatus is not complicated and large-sized to drive the entire distance measuring apparatus such that a distance measuring point is a photographed picture is not moved in acordance with the change in photographing angle of view corresponding to the change in focal distance in consideration of the above-menmtioned fifth problem.

The above first object of the present invention can be achieved by an apparatus for measuring distances at many points and having a section for performing a distance measuring operation, the apparatus comprising a projector for selectively irradiating a projected light beam to a photographed object in a plurality of directions; a light-receiving element for receiving light reflected from the photographed object; a selecting circuit for detecting the direction of at least one projected light beam corresponding to a great change in output caused in the light-receiving element when the light beam projected from the projector is selectively irradiated to the photographed object in the plural directions; and a measured distance detecting section for performing the distance measuring operation in the direction of the projected light beam detected by the selecting circuit and providing measured distance information with respect to at least one point.

The above second object of the present invention can be achieved by an apparatus for measuring distances at many points and having a section for performing a distance measuring operation, the apparatus comprising a light-receiving device for selectively receiving light reflected from a photographed object in a plurality of directions; a projector for irradiating light to the photographed object corresponding to a received light beam in the light-receiving device; a selecting circuit for detecting the direction of at least one received light beam corresponding to a great change in output caused in the light-receiving device when the projected light beam is irradiated to the photographed object from the projector; a measured distance detecting element for performing the distance measuring operation in the direction of the received light beam detected by the selecting circuit and providing measured distance information with respect to at least one point; and a moving member for moving an optical axis for distance measurement of the measured distance detecting element integrally or in association with the received light beam of the light-receiving element, the projected light beam of the projector, or both of these light beams.

The above third object of the present invention can be achieved by an apparatus for measuring distances at many points and having a section for performing a distance measuring operation, the apparatus comprising a measured distances detecting element fixed to a fixed member and receiving an image of a photographed object from two directions through two light-receiving lenses spaced from each other by a predetermined base length; a distance measuring section moving mechanism movable with respect to the measured distance detecting element in a state in which the two light-receiving lenses are integrally fixed to each other, the distance measuring section moving mechanism being constructed such that an optical axis for distance measurement is approximately moved linearly with respect to a center of the measured distance detecting element in a direction approximately perpendicular to an optical axis of a photographing optical system corresponding to the change in focal distance of the photographing optical system on a plane approximately parallel to the optical axis of the photographing optical system; and a moving position control mechanism for controlling a moving position of the optical axis for distance measurement so as to perform the distance measuring operation in at least two set moving positions.

The above fourth object of the present invention can be achieved by an apparatus for measuring distances at many points and having a section for performing a distance measuring operation, the apparatus comprising a distance measuring section rotating mechanism for providing a central axis of rotation to rotate an optical axis for distance measurement on a plane approximately parallel to an optical axis of a photographing optical system, the distance measuring section rotating mechanism setting the central axis of rotation to be parallel to a plane for distance measurement; and a rotary angle control mechanism for controlling a rotary angle of the optical axis for distance measurement so as to perform the distance measuring operation at least two rotary angles.

The above fifth object of the present invention can be achieved by an apparatus for measuring distances at many points and having a section for performing a distance measuring operation with respect to the many points in a camera in which the focal distance of a photographing lens can be changed, the apparatus comprising a light-projecting lens arranged forward from a light-projecting element section for selectively projecting a plurality of projected light beams having different light-projecting directions; a light-receiving lens arranged forward from a light-receiving element section for distance measurement for receiving light reflected from a photographed object to which a projected light beam is irradiated through the light-projecting lens; and a focal distance changing section for changing the focal distances of the both lenses corresponding to information of focal distance of the photographing lens without changing respective focusing faces of the light-receiving lens and the light-projecting lens.

In the many point distance measuring apparatus in the first embodiment of the present invention, the projected light beam is selectively irradiated by the projector to the photographed object in a plurality of directions. The light-receiving element receives light reflected from the photographed object. The selecting circuit detects the direction of at least one projected light beam corresponding to a great change in output caused in the light-receiving element. The distance measuring operation is performed in only the direction of the projected light beam detected by the selecting circuit.

In the second embodiment of the present invention, the light-receiving element selectively receives light reflected from the photographed object in a plurality of directions. The projector irradiates light to the photographed object corresponding to the received light beam in the light-receiving element. The selecting circuit detects the direction of at least one received light beam corresponding to a great change in output caused in the light-receiving element. The measured distance detecting element performs the distance measuring operation in the direction of the received light beam detected by the selecting circuit and provides measured distance information with respect to at least one point. The moving member moves the optical axis for distance measurement of the measured distance detecting element integrally or in association with the received light beam of the light-receiving element, the projected light beam of the projector, or both of these light beams.

In the third embodiment of the present invention, the measured distance detecting element is fixed to the fixed member and receives an image of the photographed object from two directions through two light-receiving lenses spaced from each other by a predetermined base length. The distance measuring section moving mechanism is movable with respect to the measured distance detecting element in a state in which the two light-receiving lenses are integrally fixed to each other. The optical axis for distance measurement is approximately moved linearly by the distance measuring section moving mechanism with respect to a center of the measured distance detecting element in a direction approximately perpendicular to the optical axis of a photographing optical system corresponding to the change in focal distance of the photographing optical system on a plane approximately parallel to the optical axis of the photographing optical system. The moving position control mechanism controls the moving position of the optical axis for distance measurement so as to perform the distance measuring operation in at least two set moving positions.

In the fourth embodiment of the present invention, the distance measuring section rotating mechanism provides a central axis of rotation to rotate the optical axis for distance measurement on a plane approximately parallel to an optical axis of the photographing optical system. The distance measuring section rotating mechanism sets the central axis of rotation to be parallel to a plane for distance measurement. The rotary angle control mechanism controls the rotary angle of the optical axis for distance measurement so as to perform the distance measuring operation at least two rotary angles.

In the fifth embodiment of the present invention, the section for performing the distance measuring operation with respect to many points is disposed in a camera in which the focal distance of the photographing lens can be changed. The light-receiving lens is arranged forward from the light-receiving element for detecting the measured distance. The light-projecting lens is arranged forward from the light-projecting element section. In the above many point distance measuring section, the focal distance changing section changes the focal distances of both lenses corresponding to information of focal distance of the photographing lens without changing respective focusing faces of the light-receiving lens and the light-projecting lens.

Further objects and advantages of the present invention will be apparent from the following description of the preferred embodiments of the present invention as illustrated in the accompanying drawings.

BRIEF DESCRIPTION OF THE DRAWINGS

FIGS. 1 to 14 are views for explaining an apparatus for measuring distances at many points in a first embodiment of the present invention in which:

FIG. 1 is a plan view of a projector;

FIG. 2 is a plan view showing optical axes of projected and received lights;

FIG. 3 is a block diagram showing a selecting circuit;

FIG. 4 is a circuit diagram showing a detailed construction of the selecting circuit showing in FIG. 3;

FIG. 5 is a plan view showing the distance measuring apparatus;

FIG. 6 is a plan view showing optical axes for distance measurement;

FIG. 7 is a front view showing a photographing field of view;

FIG. 8 is a waveform diagram showing signal waveforms in respective portions in the selecting circuit shown in FIG. 4;

FIG. 9 is a block diagram showing a modified example of the selecting circuit;

FIG. 10 is a circuit diagram showing a detailed construction of the selecting circuit shown in FIG. 9;

FIG. 11 is a waveform diagram showing signal waveforms in respective portions of the selecting circuit shown in FIG. 10;

FIG. 12 is a plan view showing a modified example of the distance measuring apparatus;

FIG. 13 is a plan view showing optical axes for distance measurement in this modified example; and FIG. 14 is a plan view showing another example of the distance measuring apparatus;

FIGS. 16 to 19 are views showing a distance measuring apparatus in a third embodiment of the present invention in which:

FIG. 16 is a plan view showing an operating state of the distance measuring apparatus in which a distance measuring operation is performed with respect to a central portion of the apparatus;

FIG. 17 is a plan view showing an operating state of the distance measuring apparatus in which the distance measuring operation is performed with respect to a right-hand portion of the apparatus;

FIG. 19 is a front view showing a photographing field of view;

FIGS. 21a and 21b and FIGS. 22a and 22b are views showing a distance measuring apparatus in a fifth embodiment of the present invention in which:

FIGS. 21a and 21b are views showing an optical path system in taking of the wide angle; and FIGS. 22a and 22b are views showing an optical path system in taking of the telescopic form.

DESCRIPTION OF THE PREFERRED EMBODIMENTS

The preferred embodiments of a many point distance measuring apparatus in the present invention will next be described in detail with reference to the accompanying drawings.

A distance measuring apparatus of a passive system in a first embodiment in the present invention will next be described in detail with reference to FIGS. 1 to 8.

Figure 1:
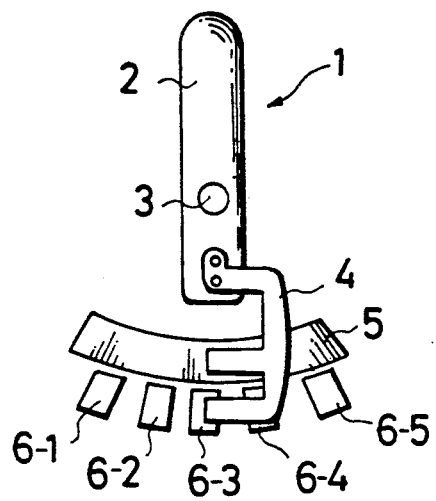

As shown in FIG. 1, a projector 1 used in this embodiment selectively irradiates a projected beam to a photographed object in a plurality of directions. A body 2 of the projector 1 can be rotated around a central axis 3 in a predetermined range of light-projecting angle. A light source composed of an infrared light-emitting diode and a light-projecting lens for forming an infrared beam emitted from this light source in the shape of a thin beam are disposed in the body 2 although the light source and the light-projecting lens are not illustrated in FIG. 1. The light beam can be irradiated forward from the body 2 (upward in FIG. 1).

A base end of a contact brush 4 is cantilever-fixed to a base portion of this body 2. A common pattern 5 is formed at a free end of this contact brush 4 and is composed of a conductor in the shape of an arc including the range of the rotary angle of the body 2. A plurality of contact patterns 6-1 to 6-5 are spaced from this common pattern 5 by a predetermined length and are divided into five sections.

Accordingly, when the body 2 is rotated around the central axis 3 by an unillustrated driving source, the free end of the contact brush 4 electrically comes in contact with the common pattern 5 at any time. The rotary angle of the body 2 is detected by the contact between the contact brush 4 and any one of the plural contact patterns 6-1 to 6-5.

Figure 2:
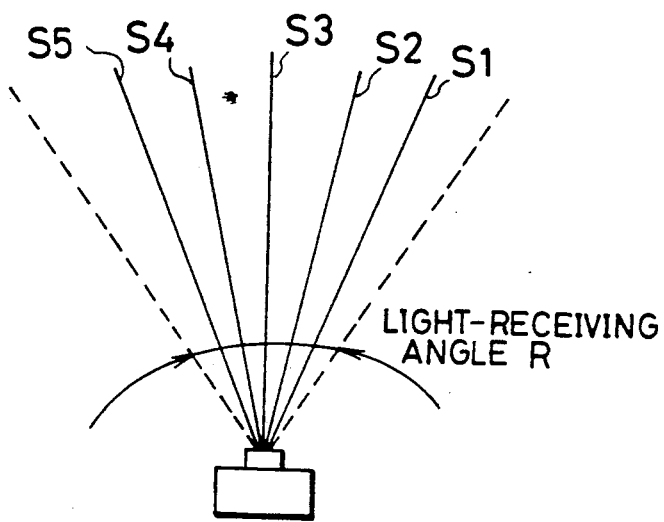

As shown in FIG. 2, such a projector 1 is disposed within the body of a camera so as to selectively irradiate a plurality of projected light beams (five beams in this embodiment) S1 to S5 from the camera body toward the photographed object.

A light-receiving element 8 has a light-receiving angle R including the range of a light-projecting angle formed by the five projected light beams S1 to S5 shown in FIG. 2 and is connected to a selecting circuit section.

Figure 3:
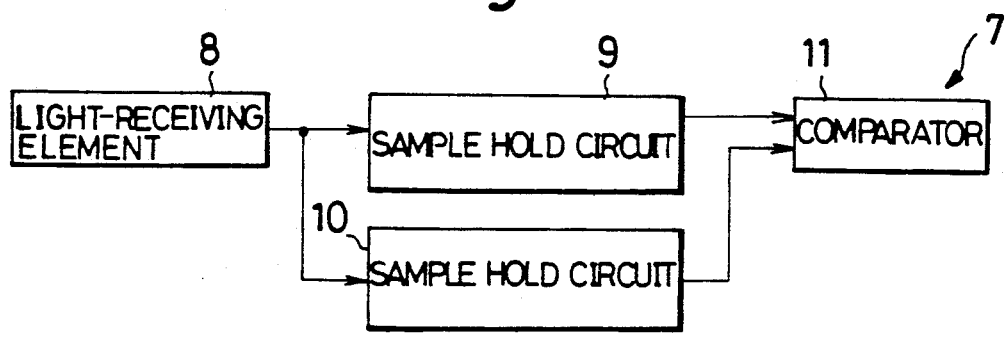

Namely, as shown in FIG. 3, an output terminal of the light-receiving element 8 is connected to each of input terminals of two sample hold circuits (which are briefly called SH circuits in the following description) 9 and 10. Each of output terminals of the SH circuits 9 and 10 is connected to a comparison input terminal of a comparator 11. An output of this comparator 11 becomes an output of a selecting circuit 7, i.e., a detecting output indicating at least one of the directions of the projected light beam corresponding to a great change in output of the above light-receiving element 8 caused when the light beam projected from the projector 1 is selectively irradiated in the plural directions.

Figure 4:
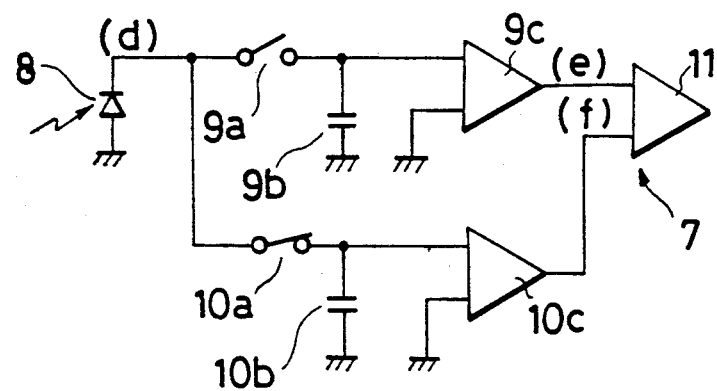

As shown in FIG. 4, the SH circuits 9 and 10 can be concretely constructed by sampling switches 9a, 10a, hold capacitors 9b, 10b and operational amplifiers 9c, 10c.

Figure 5:
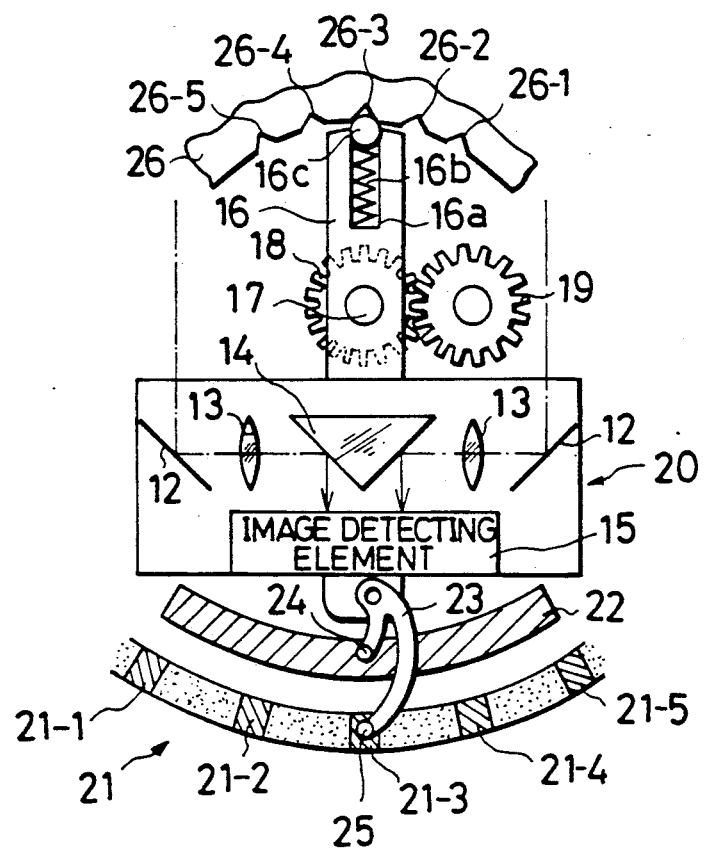
Figure 6:
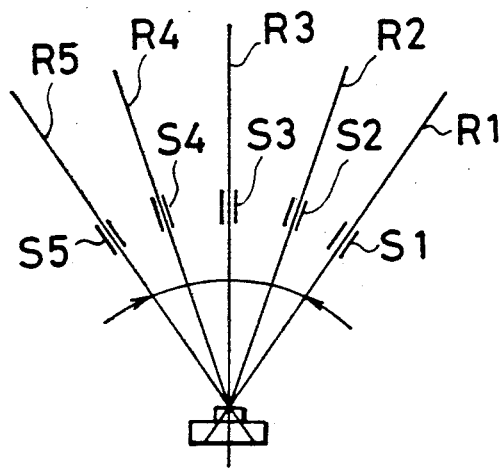
Figure 7:
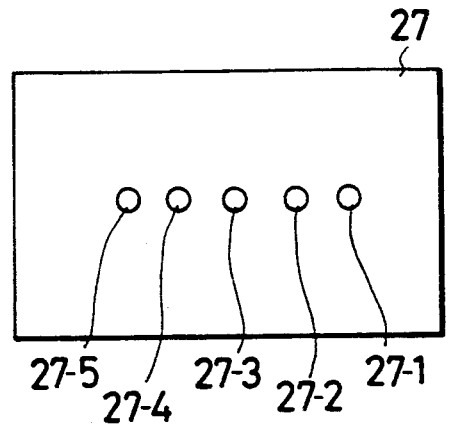

A measured distance detecting section for detecting a measured distance based on the above output of the selecting circuit 7 is constructed as a concrete example as shown in FIGS. 5 to 7.

In FIG. 5, a distance measuring section 20 of a passive system for example performs a distance measuring operation by a trigonometrical survey system and is composed of two mirrors 12, 12, two lenses 13, 13, a prism 14 and an image detecting element 15. An elongated support plate 16 supports a central portion of this distance measuring section 20 in a direction parallel to an optical lens axis in the distance measuring section 20. A rotary shaft 17 is fixed to a front end portion of the support plate 16 projected forward (upward in FIG. 5) from the distance measuring section 20. A gear 18 is fixed to the rotary shaft 17 and a gear 19 transmits a rotary force to this gear 18 from a driving source such as a motor for rotating an unillustrated optical axis for distance measurement.

Contact patterns 21 and 22 are respectively composed of an arc plate arranged on the rear side of the support plate 16. A resistor is formed on an entire surface of the contact pattern 21 and contact patterns 21-1 to 21-5 composed of five conductive films equally spaced from each other are formed in this resistor. A common conductive film is formed on an entire surface of the other contact pattern 22. A contact support piece 23 is attached to a rear end portion of the support plate 16. Contacts 24 and 25 are fixed to the contact support piece 23 and respectively come in contact with surfaces of the arc contact patterns 21 and 22.

A hole 16a is formed in a front end portion of the support plate 16. A compression spring 16b is stored on the bottom side of the support plate 16 and a ball 16c is stored on an opening side of the support plate 16. An arc ball sliding plate 26 is disposed on the front side of the support plate 16 and the above ball 16c resiliently comes in contact with a sliding face of the ball sliding plate 26 by the compression spring 16b. Click grooves 26-1 to 26-5 are formed on this sliding face of the ball sliding plate 26.

Accordingly, when the gear 19 is rotated by the rotation of the unillustrated driving source, the gear 18 is rotated and the support plate 16 is rotated around the rotary shaft 17. The inner contact 24 comes in contact with the contact pattern 22 at any time and the outer contact 25 comes in contact with the contact patterns 21-1 to 21-5. The movement of the optical axis for distance measurement can be stopped with a click at five rotary angles such that the ball 16c is engaged with the click grooves 26-1 to 26-5.

FIG. 6 is a plan view showing an optical axis for measured distance. In this figure, reference numerals R1 to R5 respectively designate optical axes for distance measurement when the ball 16c is engaged with the click grooves 26-1 to 26-5.

The contact 25 comes in contact with the respective contact patterns 21-1 to 21-5 at five locking points at which the ball 16c is engaged with the respective click grooves 26-1 to 26-5 to lock the rotary angle. Further, as shown in FIG. 6, the respective constructional portions mentioned above are constructed such that the above projected light beams S1 to S5 respectively correspond to the five optical axes R1 to R5 for distance measurement.

In the above-mentioned apparatus for measuring the distances at many points, when the distance measuring operation is started by a signal from an unillustrated system controller, the body of the projector 1 is first rotated as shown in FIG. 1 and the five light beams S1 to S5 are sequentially projected to the photographed object in a state in which the photographed object is detected in five positions of the contact patterns 6-1 to 6-5.

Figure 8:
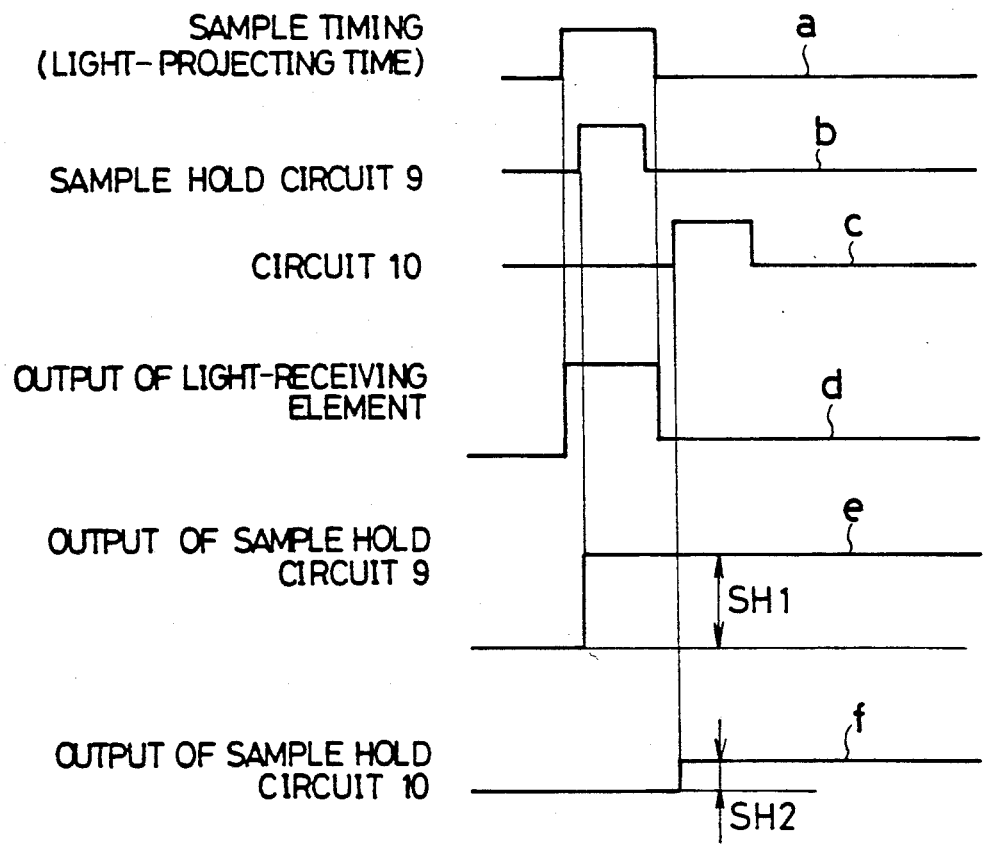

A reflected light from the photographed object is detected by the light-receiving element 8 as shown in FIGS. 3 and 4. As shown in FIG. 8, an output of the comparator 11 is transmitted in synchronization with a timing (a timing for switching light-projecting angles in the projector 1) of a signal a having a predetermined pulse width. Namely, in the SH circuit 9, a sample-holding operation is performed by a signal b for sample-holding the output of the light-receiving element 8 in a pulse portion of the signal a in taking of the light-projecting. In the SH circuit 10, the sample-holding operation is performed by a signal c for sample-holding the output of the light-receiving element 8 in a non-pulse portion of the signal a immediately after the pulse portion thereof when no light-projecting operation is performed.

When the timing of the signal a is at a high voltage level at the light-projecting time, the light reflected from the photographed object is provided as an output signal d of the light-receiving element 8. This signal d is sample-held by a pulse at the high voltage level of the signal b and is provided as a hold signal e of the light-receiving element 8 in taking of the light-projecting.

The output of the light-receiving element 8 at a low voltage level of the signal a (when no light-projecting operation is performed) is sample-held by a signal c in the SH circuit 10 and is provided as a signal f.

Thereafter, both the signals e and f are compared with each other by the comparator 11. When the difference between an output voltage SH 1 of the signal e and an output voltage SH 2 of the signal f is greater than a predetermined level, the output of the light-receiving element 8 is at the low voltage level when no light-projecting operation is performed and this output attains the high voltage level in taking of the light-projecting. In this case, the comparator 11 judges that the photographed object is located at a short distance. In contrast to this, when the above difference is equal to or less than the predetermined level, the comparator 11 judges that there is no photographed object at the short distance since the reflected light from the photographed object is small.

When there is the output of the comparator 11, it is judged whether the contact brush 4 comes in contact with any one of the contact patterns 6-1 to 6-5 as shown in FIG. 1 in the position of the light-projecting angle at this time. The specified position at this time is stored to an unillustrated memory circuit.

In this embodiment, it is assumed in the following description that the output of the comparator 11 is provided at the first, third and fourth light-projecting. Namely, it is assumed that the photographed object is selectively located at the short distance in the case of the first, third and fourth projected light beams S1, S3 and S4, respectively.

In this case, as shown in FIG. 7, it is necessary to perform the distance measuring operation in positions of a photographed picture 27 corresponding to distance measuring points 27-1, 27-3 and 27-4 of distance measuring points 27-1 to 27-5.

Concretely, the support plate 16 shown in FIG. 5 is first rotated until a position in which the rear contact 25 comes in contact with the contact pattern 21-1, and the distance measuring operation is performed. Next, the support plate 16 is rotated until a position in which the rear contact 25 comes in contact with the contact pattern 21-3 and the distance measuring operation is performed. Further, the support plate 16 is rotated until a position in which the rear contact 25 comes in contact with the contact pattern 21-5 and the distance measuring operation is performed. Thus, the distance measuring operation is completely performed with respect to the three distance measuring points 27-1, 27-3 and 27-4 shown in FIG. 7. Then, the results of the measured distances are suitably calculated and processed to determine a moving amount of the photographing lens or the position thereof on the optical axis, thereby controlling the movement of the photographing lens.

Figure 9:
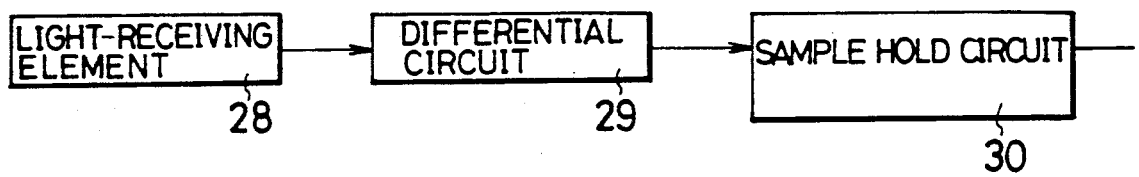
Figure 10:
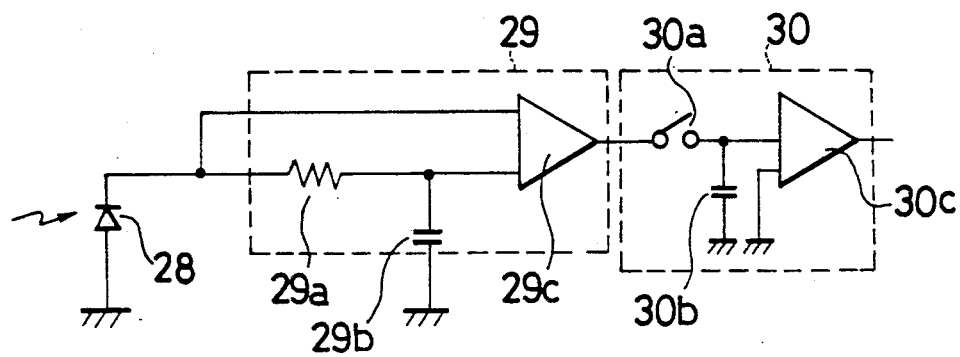

In this embodiment, the selecting circuit 7 detects the position of the light-projecting angle in which the photographed object is located at the short distance by disposing the two SH circuits 9 and 10 as shown in FIGS. 3 and 4 and by detecting the change in output of the light-receiving element 8 when the light-projecting operation is performed and not performed, respectively. However, the distance measuring apparatus may be constructed as shown in FIGS. 9 and 10.

Namely, a differential circuit 29 and an SH circuit 30 are sequentially connected to an output terminal of a light-receiving element 28 having a range of the light-receiving angle including the above-mentioned projected light beams S1 to S5. Concretely, as shown in FIG. 10, the differential circuit 29 is formed in the output terminal of the light-receiving element 28 and is composed of a differential circuit network having a resistor 29a and a capacitor 29b and an operational amplifier 29c. The SH circuit 30 is formed by a sampling switch 30a, a hold capacitor 30b and an operational amplifier 30c.

Figure 11:
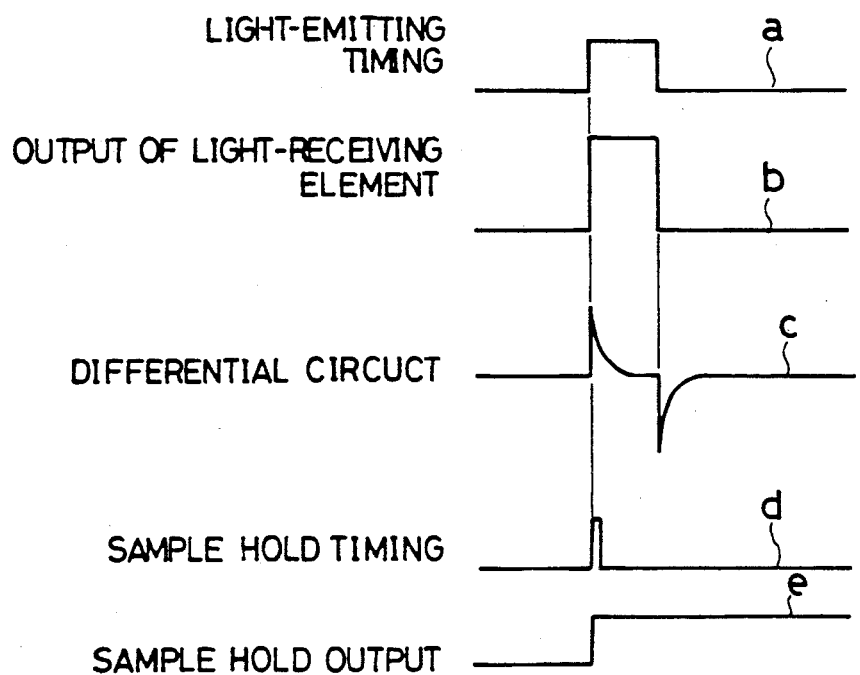

Accordingly, the output of the SH circuit 30 is taken out by synchronizing a light-emitting timing in taking of the light-projecting of the photographed object by the projector 1 with a timing of a signal a having a predetermined pulse width as shown in FIG. 11 (i.e., a switching timing of light-projecting angles in the projector 1). Namely, the changing amount of an output signal b of the light-receiving element 28 in a rise portion of the signal a at a time point for starting the light-emitting operation is a changing amount of this signal between the timing of the non light-projecting and the timing of the light-projecting. This changing amount of the output signal b is differentiated by a time constant of the resistor 29a and the capacitor 29b. A signal c of this differentiated output is sample-held by a sample hold timing signal d synchronized with the rise portion of the signal a, thereby providing an output signal e.

The voltage level of this output signal e is low when the photographed object is located at a far distance in taking of the light-projecting, and the changing amount of this signal is small in comparison with the output thereof at the time when no light-projecting operation is performed. Conversely, when the photographed object is located at the short distance, a large output is generated in comparison with the above output when no light-projecting operation is performed, thereby increasing the changing amount. Thus, it is judged that the photographed object is located at the short distance by detecting that the above changing amount is equal to or greater than a predetermined value.

When the differential output is judged to be large by the above judgement, any one of five set angles of the light-projecting optical axes at this time is specified by the contact of any one of the contact patterns 6-1 to 6-5 and the contact brush 4. These specified data are stored to an unillustrated memory circuit and the distance measuring operation is performed by the distance measuring section shown in FIG. 5 with respect to only the optical axes for distance measurement corresponding to these data. Thus, at least one distance measuring data can be obtained and a focusing operation of the photographing lens is performed on the basis of these data.

In this embodiment, before the actual measurement of the distance, it is judged by the light beam projected from the projector whether the photographed object at the short distance is located at any one of the plural distance measuring points. The distance measuring operation is performed at only the really required distance measuring points on the basis of this judging result so that it is possible to greatly reduce the time for substantially measuring the distance.

Figure 12:
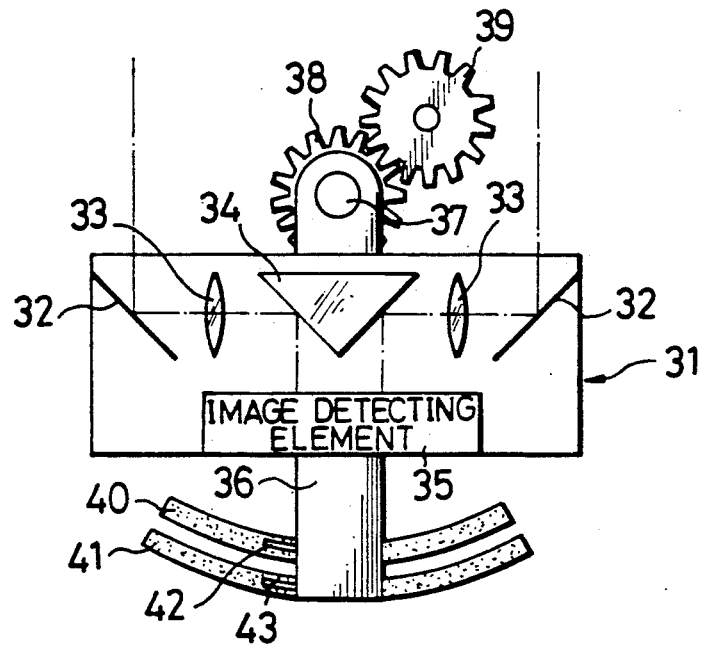

The distance measuring section in this embodiment may be constructed as shown in FIG. 12.

In FIG. 12, a distance measuring section 31 of a passive system for example performs a distance measuring operation by a trigonometrical survey system and is composed of two mirrors 32, 32, two lenses 33, 33, a prism 34 and an image detecting element 35. An elongated support plate 36 supports a central portion of the distance measuring section 31 in a direction parallel to an optical lens axis in the distance measuring section 31. A rotary shaft 37 is fixed to a front end portion of the support plate 36 projected forward (upward in FIG. 12) from the distance measuring section 31. A gear 38 is fixed to the rotary shaft 37 and a gear 39 transmits a rotary force to this gear 38 from a driving source such as a motor for rotating an unillustrated optical axis for distance measurement.

Resistance films 40 and 41 for detecting a rotary position are arranged backward from the above distance measuring section 31 (downward in FIG. 12) and have an arc pattern around the above rotary shaft 37. Brushes 42 and 43 resiliently come in contact with the resistance films 40 and 41 and are attached to a read end portion of the support plate 36 projected backward from the distance measuring section 31 (downward in FIG. 12). The rotary angle of the optical axis for distance measurement of the distance measuring section 31 is detected by a resistance value between the brushes 42, 43 and one ends of the resistance films 40, 41.

Figure 13:
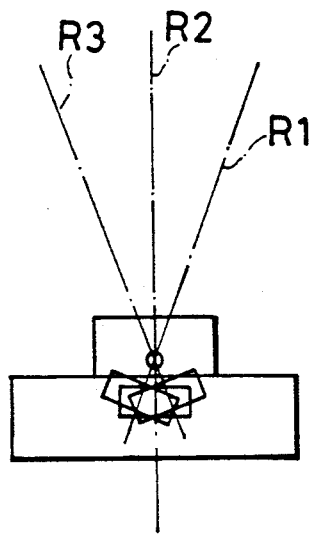

In a camera disposing this distance measuring apparatus therein, when an unillustrated control system judges a time to perform the distance measuring operation with respect to three points, the operation of a driving source is controlled such that the camera is first directed on the right-hand side thereof. Thus, the support plate 36 is rotated by this driving source and an optical axis R1 for distance measurement is rotated until the position of this optical axis is in conformity with a predetermined angular position as shown in FIG. 13. It is confirmed from the amounts of resistance values of the resistance films 40 and 41 provided through the brushes 42 and 43 whether the optical axis R1 for distance measurement is correctly directed or not. Then, the distance measuring operation is performed in a state the optical axis R1 for distance measurement is directed in a normal direction and a measured distance value is stored. Next, similarly, an optical axis R2 for distance measurement is rotated such that the position of this optical axis is in conformity with a central position of the camera. The distance measuring operation is performed in this state and a measured distance value is stored. Next, an optical axis R3 for distance measurement is set such that the position of this optical axis is in conformity with a predetermined angular position on the left-hand side of the camera. Then, the distance measuring operation is performed and a measured distance value is stored. The above three measured distance values are computed to obtain a certain value by a predetermined calculating formula and the unillustrated photographing lens is moved to a position on the optical axis corresponding to the computed value. In this case, the distance measuring operation is performed in only the angular direction of the distance measurement required by the projector 1 in advance.

In the above embodiments, the trigonometrical survey by the distance measuring section is performed by the passive system, but an active system may be used.

Figure 14:
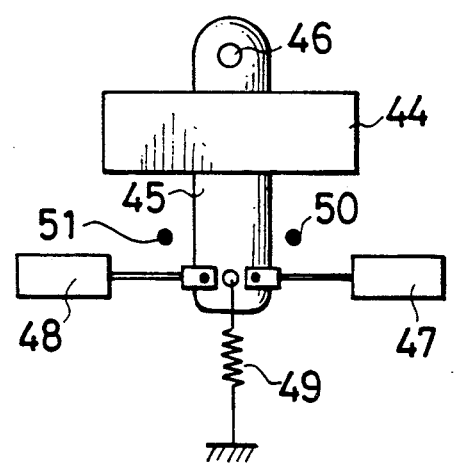

The driving source for rotating the optical axis for distance measurement can be constructed by using a rotary machine such as a motor, etc., but a plunger as shown in FIG. 14 may be used.

FIG. 14 is a plan view showing an example using the plunger.

In this figure, reference numerals 44 and 45 respectively designate a distance measuring section and a support plate for supporting the distance measuring section. The support plate 45 and the distance measuring section 44 are respectively similar to the support plate 16 and the distance measuring section 20 of the distance measuring apparatus shown in FIG. 5. A front end portion of the support plate 45 is rotatably supported by a shaft 46 and the support plate 45 is rotated by moving a rear end portion thereof by plungers 47 and 48 on the left-hand or right-hand side. A neutral spring 49 pulls the support plate 45 on the rear side thereof such that the optical axis for distance measurement is perpendicular to a front face at any time and therefore the distance measuring operation is performed with respect to a central field of view. Stoppers 50 and 51 are suitably spaced from each other on both sides of the support plate 45.

In the distance measuring apparatus in this embodiment, when the distance measuring operation is performed with respect to the central field of view, both the plungers 47 and 48 are not operated and the optical axis for distance measurement is directed onto the front face by the resilient force of the neutral spring 49. The distance measuring operation with respect to the field of view on the left-hand side is performed by rotating the support plate 45 by the operation of the plunger 47 until a position in which this support plate hits against the stopper 50. Next, the distance measuring operation with respect to the field of view on the right-hand side is performed by rotating the support plate 45 by the operation of the other plunger 48 until a position in which this support plate hits against the stopper 51.

Further, as a modified example of the embodiment shown in FIG. 14, the optical axis for distance measurement may be rotated by pressing the support plate 45 on one side thereof and swinging this support plate using a spring instead of the plunger.

Next, a distance measuring apparatus in a second embodiment of the present invention will next be described with reference to FIGS. 15 and 16.

Figure 15:
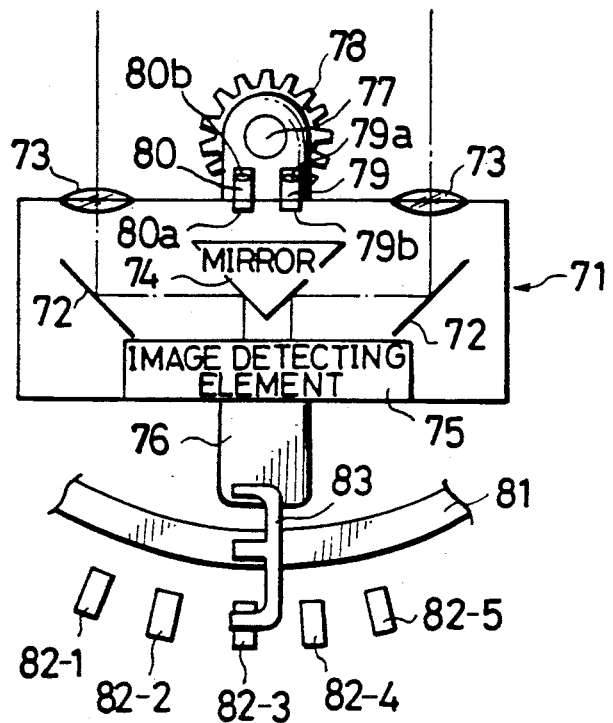
FIG. 15 is a plan view showing a distance measuring apparatus in a second embodiment of the present invention.

In FIG. 15, a distance measuring section 71 of a passive system performs a distance measuring operation by a trigonometrical survey system and is composed of two mirrors 72, 72, two lenses 73, 73, a prism 74 and an image detecting element 75. An elongated support plate 76 supports a central portion of the distance measuring section 71 in a direction parallel to an optical axis in the distance measuring section 71. A rotary shaft 77 is fixed to a front end portion of the support plate 76 projected forward (upward in FIG. 15) from the distance measuring section 71. A gear 78 is fixed to the rotary shaft 77 and a rotary force is transmitted to this gear 78 from a driving source such as a motor for rotating an unillustrated optical axis for distance measurement.

A light-receiving device 79 receives light reflected from the photographed object in a light-receiving region in the shape of a beam and is fixed to the distance measuring section 71 and is constructed by a light-receiving lens 79a and a light-receiving element 79b.

A projector 80 irradiates light to the photographed object corresponding to a set beam of the received light in the above light-receiving device. This projector 80 is fixed to the distance measuring section 71 such that an optical axis for light-projection is parallel to that for light-reception in the light-receiving device 79 fixed to the distance measuring section 71. The projector 80 is constructed by a light-emitting element 80a composed of an infrared light-emitting diode and a light-projecting lens 80b.

Reference numeral 81 designates an arc common pattern around the above rotary shaft 77 for detecting a rotary position and arranged backward from the above distance measuring section 71 (downward in FIG. 15).

Contact patterns 82-1 to 82-5 are arranged backward from this common pattern 81 and are provided by dividing an arc in a predetermined range around the above rotary shaft 77 into five sections every predetermined angle. The contact patterns 82-1 to 82-5 and the common pattern 81 resiliently come in contact with a brush 83. The patterns 82-1 to 82-5 and 81 are attached to a rear end portion of the support plate 76 projected backward from the distance measuring section 71 (downward in FIG. 15) to provide a selective contact between these patterns and the brush. The rotary angles of the optical axes for light-projection and light-reception of the projector 80 and the light-receiving device 79 and the optical axis for distance measurement are detected as a whole by a contacting state between the brush 83 and the contact patterns 82-1 to 82-5.

In the distance measuring section 71 having the above projector 80 and the light-receiving device 79 therein, when an unillustrated control system judges a time to perform the distance measuring operation with respect to three points, the operation of a driving source is first controlled such that the entire distance measuring section 71 is directed on the right-hand side. Thus, the support plate 76 is rotated by the operation of this driving source until the angular position of the projected light beam R1, which is similar to the case shown in FIG. 6. It is judged and confirmed by the electrical contact between the contact brush 83 and the first contact pattern 82-1 whether or not the optical axis of the projector 80 is in conformity with the projected light beam S1.

After this confirmation, an electric current flows through the light-emitting element 80a and an emitted light beam at this time is formed as a parallel light beam by the light-projecting lens 80b and is irradiated to the photographed object as a projected light beam S1. The light reflected from the photographed object at this irradiating time is detected by the light-receiving element 79b of the light-receiving device 79. Further, a change in output of the light-receiving element 79b, i.e., a changing amount in output between the case of the non-projecting and the case of the projecting is detected by a circuit similar to the above-mentioned sample hold circuit (see FIGS. 3 and 4) or a circuit similar to the above-mentioned differential circuit (see FIGS. 9 and 10). When the light is projected from the projector 80 and a great change in operation is caused in the light-receiving element 79b, it is judged that the photographed object at a short distance exists on an axis at this set angle and this judging result is stored to an unillustrated memory circuit.

Similarly, it is sequentially judged whether or not the photographed object at the short distance exists with respect to an adjacent set angle, and it is detected whether the photographed object at the short distance is located at any one of the five set angles.

Next, similar to the above case, the distance measuring operation is performed with respect to only the set angle really required on the basis of this judging result and the unillustrated photographing lens is moved and focused.

In this embodiment, the projector 80 and the light-receiving device 79 are integrally fixed to the distance measuring section 71 constructed by the mirrors 72, 72 and the lenses 73, 73, etc. the projected light beams S1 to S5 of the projector 80 and the received light beams R1 to R5 of the light-receiving device 79 completely follow integrally the movement of the optical axis for distance measurement in the optical system for performing the distance measuring operation. Accordingly, when an aligning operation with respect to the optical axes is performed at an assembly of the apparatus, there is no shift in optical axis caused by the above movement when the distance measuring operation is performed with respect to many points. Thus, it is possible to select the photographed object at the short distance and perform the distance measuring operation in the selected set angular position with very high accuracy.

Next, a distance measuring apparatus in a third embodiment of the present invention will be described with reference to FIGS. 16 to 19.

The distance measuring apparatus in this embodiment is suitable for a camera in which the focal distance of the photographing lens can be changed at telescopic and wide angle stages.

Figure 16:
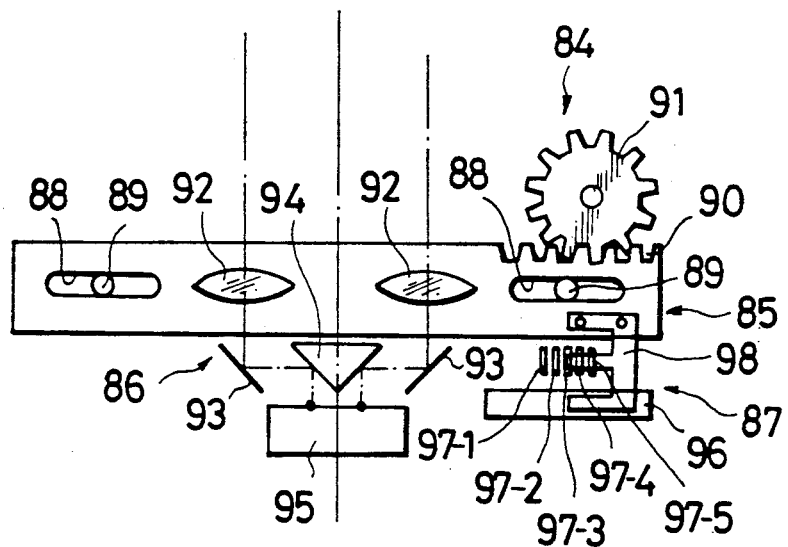

In FIG. 16, a distance measuring section 84 measures the distance of a photographed object and is mainly constructed by a moving member 85, a fixed section 86 and a position detecting section 87.

The moving member 85 is formed by an elongated plate and elongated guide holes 88, 88 are disposed in the longitudinal direction of this plate. These guide holes 88, 88 are engaged with guide pins 89, 89 to restrict the movements of the guide holes in the upward and downward directions and allow the movements thereof in the right-hand and left-hand directions. A rack portion 90 is formed on an upper face of this moving member 85 in a right-hand end portion thereof. This rack portion 90 is engaged with a gear 91 for linearly moving the moving member 85 in the right-hand and left-hand directions.

Two lenses 92, 92 are fixed to this moving member 85 and are spaced from each other by a predetermined base length. The fixed section 86 is located backward from the lenses 92, 92. In this fixed section 86, two mirrors 93, 93 are arranged and a trigonal prism 94 is arranged in a central portion between the mirrors 93, 93. A detecting element 95 for distance measurement is fixed backward from the trigonal prism 94.

The position of the moving member 85 provided by the linear movement thereof is detected by the position detecting section 87. Namely, a common pattern 96 is formed by a conductor and is parallel to the longitudinal direction of the moving member 85. Contact patterns 97-1 to 97-5 are divided into five sections in parallel to the common pattern 96. Further, a contact brush 98 comes in contact with this common pattern 96 at any time and follows the linear movement of the moving member 85 to provide a selective contact between the brush and the contact patterns 97-1 to 97-5.

Figure 18A:
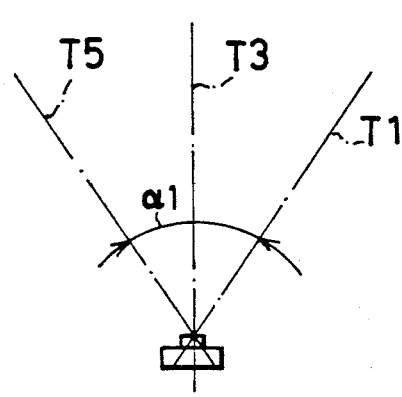
FIG. 18a is a plan view showing optical axes for distance measurement in taking of a wide angle.

In the distance measuring section 84 constructed as above, when the photographing lens is set on the wide angle side, a wide photographing angle α1 of view shown in FIG. 18a is provided and the optical axis for distance measurement can be moved at three rotary angles such that the outer contact patterns 97-1 and 97-5 and the central contact pattern 97-3 come in contact with the common pattern 96 through the contact brush 98. Reference numeral T1 designates an optical axis for distance measurement in the case of the contact of the contact pattern 97-1. Reference numeral T3 designates an optical axis for distance measurement when the contact pattern 97-3 comes in contact with the common pattern 96. Reference numeral T5 designates an optical axis for distance measurement when the contact pattern 97-5 comes in contact with the common pattern 96.

Figure 18B:
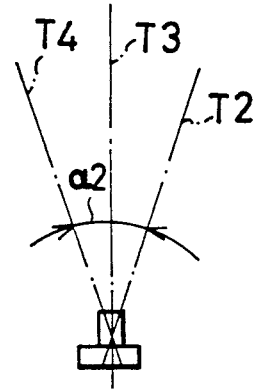
FIG. 18b is a plan view showing optical axes for distance measurement in taking of a telescopic form.

When the photographing lens is located on the telescopic side, a small photographing angle α2 of view shown in FIG. 18b is provided and this angle is approximately half the angle of view in the case of the wide angle concretely. The movement of the optical axis for distance measurement can be stopped with a click at three rotary angles such that the outer contact patterns 97-2 and 97-4 and the central contact pattern 97-3 come in contact with the common pattern 96 through the contact brush 98.

Reference numeral T2 designates an optical axis for distance measurement when the contact pattern 97-2 comes in contact with the common pattern 98. Reference numeral T3 designates an optical axis for distance measurement when the contact pattern 97-3 comes in contact with the common pattern 96. Reference numeral T4 designates an optical axis for distance measurement when the contact pattern 97-4 comes in contact with the common pattern 96.

Figure 19:
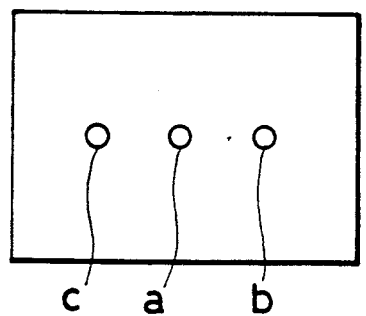

The photographed object on the optical axis T3 for distance measurement occupies position a on a finder 14 in FIG. 19. The photographed object on the optical axes T1 and T2 for distance measurement occupies position b on the finder. The photographed object on the optical axes T4 and T5 for distance measurement occupies position c on the finder 14.

Figure 17:
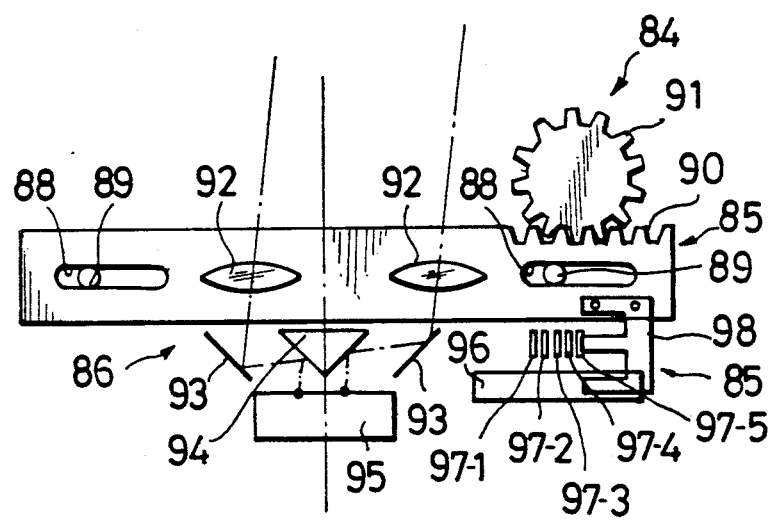

This camera is operated as follows. When an unillustrated control system judges a time to perform the distance measuring operation with respect to three points, it is detected whether the photographing lens is located on the telescopic or wide angle side. In the case of the wide angle side, the moving member 85 is moved by the rotation of the gear 91 to a position in which the central contact pattern 97-3 comes in contact with the common pattern 96 through the contact brush 98. Then, the distance measuring operation is performed with respect to the optical axis T3 for distance measurement (in the finder position a). Next, similarly, the moving member 85 is moved to a position in which the common pattern comes in contact with the contact pattern 97-1 on the most left-hand side, and the distance measuring operation is performed with respect to the optical axis T1 for distance measurement (in the finder position c). Next, similarly, the moving member 85 is moved to a position in which the common pattern 96 comes in contact with the contact pattern 97-5 on the right-hand side through the contact brush 98 as shown in FIG. 17. Then, the distance measuring operation is performed with respect to the optical axis T1 for distance measurement (in the finder position b). Thus, the distance measuring operation with respect to the three points is completely performed and the three distance measuring results are suitably calculated and processed to determine the moving amount of the photographing lens or the position thereof on the optical axis, thereby controlling the movement of the photographing lens.

In the telescopic case, the moving member 85 is moved to respective rotary positions in which the contact patterns 97-2, 97-3 and 97-4 come in contact with the common pattern 96, and the distance measuring operation is performed in these positions. The respective distance measuring results are calculated and processed to determine the moving amount of the photographing lens or the position thereof on the optical axis, thereby controlling the movement of the photographing lens.

Accordingly, in accordance with the present invention, when the distance measuring point is moved, the entire distance measuring optical system is not moved as in the conventional apparatus, but only the lens is moved without moving the other optical systems. Accordingly, loss of energy for driving the distance measuring apparatus is reduced so that the operation of the distance measuring apparatus can be controlled at a high speed and the apparatus can be made compact. Further, the two lenses in two optical systems for detecting the focus operation can be integrally moved so that it is possible to reduce the relative shift in position between the two optical axes as much as possible.

The optical axis for distance measurement is changed in accordance with the wide angle and telescopic cases of the photographing lens. Namely, the relative angle of the plural optical axes for distance measurement is increased in taking of the wide angle and is decreased in taking of the telescopic form. Accordingly, the distance measuring point in the field of view in the finder is not changed.

In such a camera, a suitable distance measuring operation with respect to three points can be performed in accordance with the telescopic and wide angle cases when the photographing lens is set on the telescopic and wide angle sides.

In this embodiment, the above position detection is performed in stages, but can be performed with no stage. Further, instead of the click stop in stages by the click stop mechanism, it is possible to provide a construction corresponding to a camera with a zoom lens using engagement with no stage by frictional engagement, etc.

A distance measuring apparatus in a fourth embodiment of the present invention will next be described in detail with reference to FIG. 20.

Figure 20:
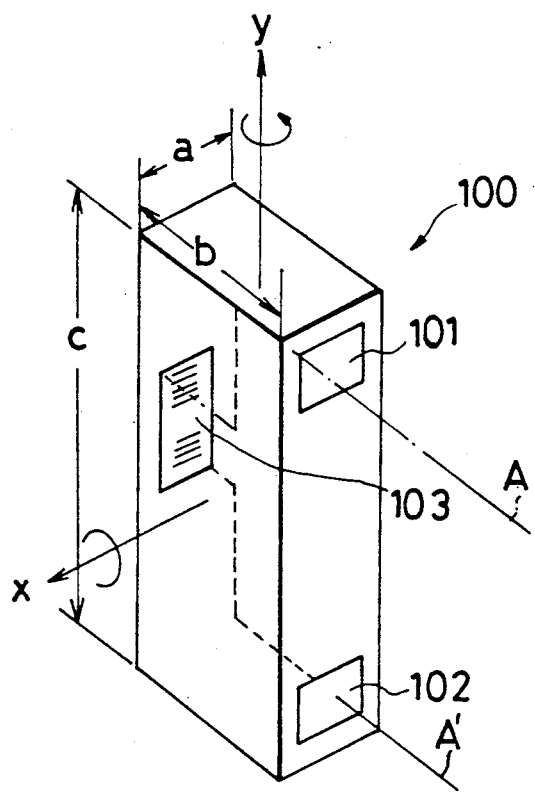
FIG. 20 is a perspective view showing a distance measuring apparatus in a fourth embodiment of the present invention.

In FIG. 20, a distance measuring section 100 has a rectangular shape and the lengths of respective sides thereof are set to a, b and c. Optical axes A and A' of an image forming optical system for distance measurement are respectively formed above and below a photographing optical axis or an arbitrary optical axis shifted from this photographing optical axis. The optical axis for distance measurement is constructed by these optical axes A and A' and can be rotated and moved on a plane approximately parallel to the optical axis of the photographing optical system. The central axis of rotation at this case is parallel to a plane for distance measurement.

Accordingly, the right-hand and left-hand directions in an unillustrated camera body are constructed by an axis shown by reference numeral x and the vertical direction is constructed by an axis shown by reference numeral y.

A detecting element 103 for distance measurement provides measured distance data by detecting a shift in phase between the optical axes A and A'. Since the optical axis for distance measurement is constructed by the optical axes A and A', the arranging direction of elements in array in the detecting element 103 is approximately perpendicular to the above x axis and is therefore the vertical direction.

Further, an unillustrated mechanism for controlling the operation of the distance measuring section is disposed to locate this distance measuring section in a plurality of set angular positions with the y axis as a central axis of rotation to perform the distance measuring operation with respect to many points. This mechanism can be set as the rotating mechanisms shown in FIGS. 5 and 12, etc.

Accordingly, when the distance measuring section 100 is rotated with the y axis as the central axis of rotation in accordance with the angle of view of the photographing lens or in advance the angular position in which the photographed object at a short distance exists, the accuracy in angular position to be stopped in rotation does not directly relate to an error in distance measurement. Namely, when the stoppage position in the angular direction by the above rotation is slightly located excessively before and after a predetermined position, an area for distance measurement is slightly shifted, but no error is caused with respect to a distance measuring component in the detecting element 103 for distance measurement. In other words, there is no shift of the optical axes A and A' in the direction perpendicular to the arranging direction of the small elements in the detecting element 103.

Further, moment of inertia $\{Iy=(a^2+c^2)/12\}$ in rotation with the y axis as the central axis, i.e., the axis in the longitudinal direction as a center is very small in comparison with moment of inertia $\{Ix=(b^2+c^2)/12\}$ in rotation with the x axis as the central axis (axis in a direction perpendicular to the longitudinal direction) as in the conventional apparatus. Accordingly, the time required to perform the above rotation is shortened and accuracy in operation can be improved in comparison with that in the conventional apparatus even when the driving source is made compact.

Further, a transient vibration is caused when the movement of the distance measuring section is stopped in the predetermined angular position. However, this vibration does not become an error in distance measuring component by the construction similar to that in the above case so that only a practically negligible change in area for distance measurement is caused.

A distance measuring apparatus in a fifth embodiment of the present invention will next be described with reference to FIGS. 21 and 22.

In this fifth embodiment, the distance measuring apparatus of the present invention is applied to a camera having a section for performing the distance measuring operation with respect to many points in an active system in which the focal distance of a photographing lens can be changed on the wide angle and telescopic sides and the distance measuring operation with respect to three points is performed.

Figure 21A:
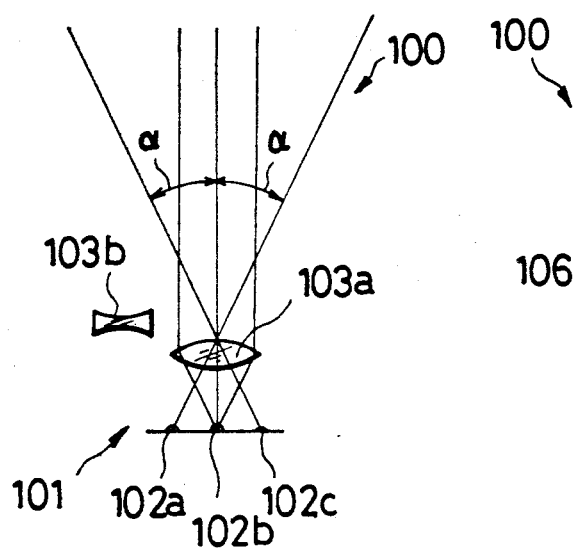
Figure 21B:
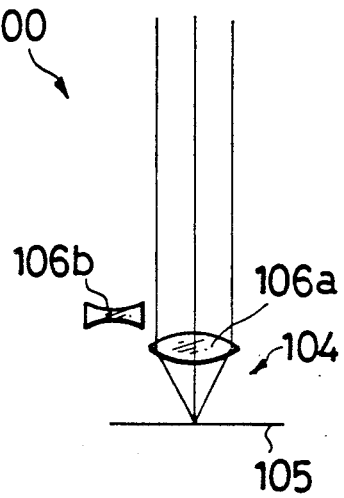

In FIGS. 21a and 21b, a many point distance measuring section 100 is mainly constructed by a projector 101 for distance measurement and a light-receiving device 104 for distance measurement.

In the projector 101, three light-emitting elements 102a, 102b and 102c are spaced from each other by a predetermined distance and are fixed in a line, thereby constituting a light-projecting element section for selectively emitting plural (three) projected light beams having different light-projecting directions. A light-projecting lens is constructed by a first lens 103a as a positive lens and a second lens 103b as a negative lens and is arranged forward from the light-projecting element section. The focal distances of the first lens 103a and the second lens 103b are changed by an unillustrated section for changing the focal distance described in detail later. In the control of the focal distance by this changing section, when the photographing lens is set on the wide angle side, the second lens 103b is completely escaped from the range of a light-projecting optical axis as shown in FIG. 21a and a focusing face of the first lens 103a is arranged on an arranging face of the above light-emitting elements 102a, 102b and 102c.

Figure 22A:
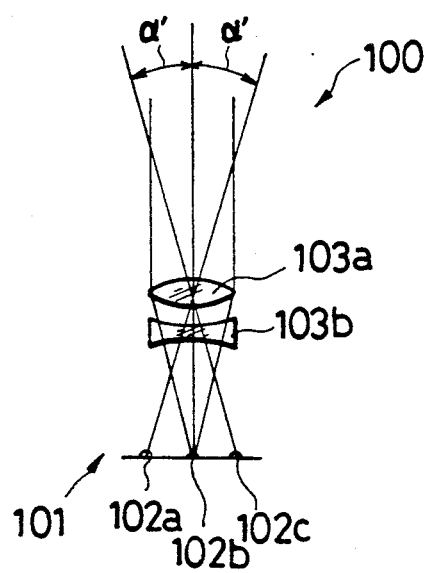
Figure 22B:
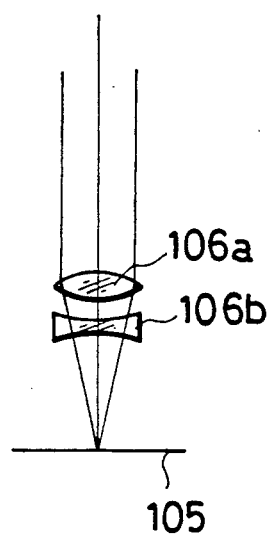

When the photographing lens is set on the telescopic side, as shown in FIG. 22a, the operations of the first and second lenses 103a and 103b are controlled such that the first lens 103a is moved away from the respective light-receiving elements 102a, 102b and 102c and the second lens 103b is arranged between the first lens 103a and the respective light-receiving elements 102a, 102b and 102c.

A light-receiving element section 105 for distance measurement is arranged in parallel to the projector 101 for distance measurement constructed above and is fixed to this projector 101. A light-receiving lens is composed of a first lens 106a as a positive lens and a second lens 106b as a negative lens and is arranged forward from this light-receiving element section 105 for distance measurement. Similar to the case of the above first and second lenses 103a and 103b, when the photographing lens is set on the wide angle side, as shown in FIG. 21b, the second lens 106b is completely escaped from the range of a light-receiving optical axis by the operation of the above focal distance changing section, and a focusing face of the first lens 106a is located on a light-receiving face of the above light-receiving element section 105 for distance measurement.

Further, similar to the case of the above first and second lenses 103a and 103b, when the photographing lens is set on the telescopic side, the operations of the first and second lenses 106a and 106b are controlled such that the first lens 106a is moved forward and the second lens 106b is arranged between the first lens 106a and the light-receiving element section 105.

Accordingly, when the photographing lens is set on the wide angle side and light is sequentially emitted from the three light-projecting elements 102a, 102b and 102c, three projected light beams are irradiated toward the photographed object every angle α since the light-projecting optical system is constituted to have a short focal distance formed by only the first lens 103a.

The light reflected from the photographed object at this case is incident to the light-receiving element section 105 for distance measurement through the first lens 106a. Since the light-receiving optical system is constructed to have a short focal distance formed by only the first lens 106a, data for distance measurement are provided in a distance measuring region corresponding to each of the three projected light beams.

On the other hand, when the photographing lens is set on the telescopic side and light is sequentially emitted from the three light-projecting elements 102a, 102b and 102c, the light-projecting optical system is constructed to have a long focal distance formed by a combination of the first and second lenses 103a and 103b so that the three projected light beams are irradiated toward the photographed object every angle α' smaller than the above angle α.

Since the light-receiving optical system is constructed to have a long focal distance formed by a combination of the first and second lenses 106a and 106b with respect to the light reflected from the photographed object, data for distance measurement with respect to the three points are provided in a distance measuring region corresponding to each of the three projected light beams.

Accordingly, when the distance measuring operation with respect to three points is performed in taking of the wide angle or telescopic form, there is no change in many point distance measuring area with respect to the photographing field of view irrespective of the change in focal distance of the photographing lens.

In this embodiment, the focal distance of the photographing lens is changed at the wide angle and telescopic stages. However, when the photographing lens is constructed by a zoom lens, it is possible to change the respective focal distances of the light-projecting and light-receiving lenses in the light-projecting and light-receiving optical systems in the light-projecting and light-receiving devices for distance measurement.

As mentioned above, in accordance with the present invention, various kinds of effects can be obtained as follows.

(1) It is possible to provide a many point distance measuring apparatus simplified in construction as much as possible and reducing a time for substantially measuring distances at many points.

(2) It is possible to provide a many point distance measuring apparatus of an active system in which the capacity of a light source is reduced as much as possible so as to irradiate light of the light source to only a region in which distance is really measured and the light source can be moved integrally with a portion for measuring the distances at many points with high accuracy.

(3) It is possible to provide a many point distance measuring apparatus in which the entire apparatus can be made compact without using members such as a motor having a large driving force for driving the entire distance measuring apparatus.

(4) It is possible to provide a many point distance measuring apparatus in which no noise is provided as measured distance information in a rotary stopping state of the distance measuring apparatus in the measurement of distances at many points and the rotary driving force can be reduced.

(5) It is possible to provide a many point distance measuring apparatus in which no large-sized driving source is required and the apparatus is not complicated and large-sized to drive the entire distance measuring apparatus such that a distance measuring point in a photographed picture is not moved in accordance with the change in photographing angle of view corresponding to the change in focal distance.

Many widely different embodiments of the present invention may be constructed without departing from the spirit and scope of the present invention. It should be understood that the present invention is not limited to the specific embodiments described in the specification, except as defined in the appended claims.

What is claimed is:

1. An apparatus for measuring distances at many points and having means for performing a distance measuring operation, said apparatus comprising:
    a projector for selectively irradiating a projected light beam to an object to be photographed in a plurality of directions;
    a light-receiving element for receiving said projected light beam reflected from said object to be photographed;
    a selecting circuit for detecting at least one direction of the projected light beam corresponding to a predetermined magnitude of change in output caused in said light-receiving element when the light beam projected from said projector is selectively irradiated to the object to be photographed in the plural directions and for thereby judging whether the object to be photographed at a short distance is located at any one of plural distance measuring points; and
    a measured distance detecting means for performing the distance measuring operation in the at least one direction of the projected light beam detected by said selecting circuit and providing measured distance information with respect to at least one measuring point.

2. A distance measuring apparatus as claimed in claim 1, wherein the distance measuring operation is performed at only the really required distance measuring points on the basis of the judging result.

3. A distance measuring apparatus as claimed in claim 1, said apparatus further comprising:
    a measured distance detecting element fixed to a fixed member and receiving an image of said object to be photographed from two directions through two light-receiving lenses spaced from each other by a predetermined base length;
    a distance measuring means moving mechanism movable with respect to said measured distance detecting element in a state in which said two light-receiving lenses are integrally fixed to each other, said distance measuring means moving mechanism being constructed such that an optical axis for distance measurement is approximately moved linearly with respect to a center of said measured distance detecting element in a direction approximately perpendicular to an optical axis of a photographing optical system corresponding to the change in focal distance of the photographing optical system on a plane approximately parallel to the optical axis of the photographing optical system; and
    a moving position control mechanism for controlling a moving position of said optical axis for distance measurement so as to perform the distance measuring operation in at least two set moving positions.

4. A distance measuring apparatus as claimed in claim 3, wherein the entire apparatus is constructed without using members such as a motor having a large driving force for driving the entire distance measuring apparatus.

5. A distance measuring apparatus as claimed in claim 1, said apparatus further comprising:
    a distance measuring means rotating mechanism for providing a central axis of rotation to rotate an optical axis for distance measurement on a plane approximately parallel to an optical axis of a photographing optical system, said distance measuring means rotating mechanism setting the central axis of rotation to be parallel to a plane for distance measurement; and
    a rotary angle control mechanism for controlling a rotary angle of said optical axis for distance measurement so as to perform the distance measuring operation at least two rotary angles.

6. A distance measuring apparatus as claimed in claim 5, wherein no noise is provided as measured distance information in a rotary stopping state of the distance measuring apparatus in the measurement of distances at many points.

7. An apparatus for measuring distances at many points and having means for performing a distance measuring operation, said apparatus comprising:

a projector for selectively irradiating a projected light beam to an object to be photographed in a plurality of directions;

a light-receiving element for receiving said projected light beam reflected from said object to be photographed;

a selecting circuit for detecting at least one direction of the projected light beam corresponding to a predetermined magnitude of change in output caused in said light-receiving element when the light beam projected from said projector is selectively irradiated to the object to be photographed in the plural directions and for thereby judging whether the object to be photographed at a short distance is located at any one of plural distance measuring points;

a measured distance detecting means for performing the distance measuring operation in the at least one direction of the projected light beam detected by said selecting circuit and providing measured distance information with respect to at least one measuring point; and a moving member for moving an optical axis for distance measurement of said measured distance detecting means integrally or in association with at least one of the received light beam of said light-receiving element and the projected light beam of said projector.

8. A distance measuring apparatus as claimed in claim 7, wherein the capacity of a light source is reduced as much as possible so as to irradiate light of the light source to only a region in which distance is really measured.

9. A distance measuring apparatus as claimed in claim 8, wherein the light source is moved integrally with a portion for measuring the distances at many points.

10. A distance measuring apparatus as claimed in claim 7 in a camera in which the focal distance of a photographing lens can be changed, said apparatus further comprising:

a light-projecting lens arranged forward from a light-projecting element means for selectively projecting a plurality of projected light beams having different light-projecting directions;

a light-receiving lens arranged forward from a light-receiving element means for distance measurement for receiving light reflected from a photographed object to which a projected light beam is irradiated through said light-projecting lens; and a focal distance changing means for changing the focal distances of said both lenses corresponding to information of focal distance of said photographing lens without changing respective focusing faces of light-receiving lens and the light-projecting lens.

11. A distance measuring apparatus as claimed in claim 10, wherein no large-sized driving source is required to drive the entire distance measuring apparatus such that a distance measuring point in a photographed picture is not moved in accordance with the change in photograhing angle of view corresponding to the change in focal distance.

* * * * *